(12) United States Patent
Tokida et al.

(10) Patent No.: US 12,182,986 B2
(45) Date of Patent: Dec. 31, 2024

(54) IMAGE-BASED ACCEPTANCE LEARNING DEVICE, IMAGE-BASED ACCEPTANCE DETERMINATION DEVICE, AND IMAGE READING DEVICE

(71) Applicant: Mitsubishi Electric Corporation, Tokyo (JP)

(72) Inventors: Naoyuki Tokida, Tokyo (JP); Atsushi Ito, Tokyo (JP); Yoshihiro Amamori, Tokyo (JP); Kosaku Yamagata, Tokyo (JP); Kazuya Makabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 194 days.

(21) Appl. No.: 17/784,122

(22) PCT Filed: Dec. 15, 2020

(86) PCT No.: PCT/JP2020/046691
§ 371 (c)(1),
(2) Date: Jun. 10, 2022

(87) PCT Pub. No.: WO2021/125154
PCT Pub. Date: Jun. 24, 2021

(65) Prior Publication Data
US 2023/0025299 A1 Jan. 26, 2023

(30) Foreign Application Priority Data
Dec. 16, 2019 (JP) .................. 2019-226284

(51) Int. Cl.
G06T 7/00 (2017.01)
G01N 21/956 (2006.01)
(Continued)

(52) U.S. Cl.
CPC ......... *G06T 7/0004* (2013.01); *G01N 21/956* (2013.01); *H04N 1/00816* (2013.01);
(Continued)

(58) Field of Classification Search
CPC ......... G06T 7/0004; G06T 2207/10024; G06T 2207/20081; G06T 2207/30108;
(Continued)

(56) References Cited

U.S. PATENT DOCUMENTS 7,176,433 B1* 2/2007 Rosengaus ......... G01N 21/9501
250/559.07
2004/0218040 A1* 11/2004 Akiyama ................. H04N 7/18
348/92

(Continued)

FOREIGN PATENT DOCUMENTS

JP 1-300668 A 12/1989
JP 2004-108828 A 4/2004
(Continued)

OTHER PUBLICATIONS

Ozaki Maya translation of JP 2019023588 Jul. 24, 2017 (Year: 2017).*

(Continued)

*Primary Examiner* — Zaihan Jiang
(74) *Attorney, Agent, or Firm* — XSENSUS LLP

(57) ABSTRACT

An image-based acceptance learning device (2) learns a result of determination as to whether a planar object (1) is acceptable or defective based on at least one of a three-dimensional shape or a color on a surface of the planar object (1). The device (2) includes a surface image receiver (3) to receive an inputted two-dimensional data being image data of the surface of the planar object (1), a determination information receiver (4) to receive an inputted determination information indicating the result of determination as to
(Continued)

whether the planar object (1) corresponding to the two-dimensional data is acceptable or defective, and a learner (5) to learn, based on the two-dimensional data and the determination information, a relevant area (1R) including the three-dimensional shape or the color on the surface in the two-dimensional data. The relevant area is a basis for the determination information.

26 Claims, 10 Drawing Sheets

(51) Int. Cl.
  *H04N 1/00* (2006.01)
  *H04N 1/03* (2006.01)
(52) U.S. Cl.
  CPC ....... *H04N 1/00827* (2013.01); *H04N 1/0306* (2013.01); *G06T 2207/10024* (2013.01); *G06T 2207/20081* (2013.01); *G06T 2207/30108* (2013.01)
(58) Field of Classification Search
  CPC ............. G01N 21/956; H04N 1/00816; H04N 1/00827; H04N 1/0306
  See application file for complete search history.

(56) References Cited

U.S. PATENT DOCUMENTS

| | | | | |
|---|---|---|---|---|
| 2006/0165273 | A1* | 7/2006 | Akiyama | G01R 31/2808 382/145 |
| 2007/0177137 | A1* | 8/2007 | Kamada | G01N 21/8806 356/237.2 |
| 2007/0237385 | A1* | 10/2007 | Kato | G01N 21/9501 382/149 |
| 2009/0087082 | A1* | 4/2009 | Abe | G06V 30/144 382/147 |
| 2009/0129664 | A1* | 5/2009 | Tsuchiya | G06T 7/001 382/149 |
| 2010/0289891 | A1* | 11/2010 | Akiyama | G01B 11/245 348/126 |
| 2012/0128378 | A1* | 5/2012 | Izumiya | G03G 15/5041 399/26 |
| 2012/0275802 | A1* | 11/2012 | Tomita | G03G 15/6561 399/38 |
| 2013/0188129 | A1* | 7/2013 | Inoue | A61B 3/102 351/221 |
| 2014/0063451 | A1* | 3/2014 | Ono | A61B 3/0058 351/246 |
| 2019/0139212 | A1* | 5/2019 | Hanzawa | G06N 3/08 |

FOREIGN PATENT DOCUMENTS

| | | | |
|---|---|---|---|
| JP | 2015-68670 | A | 4/2015 |
| JP | 2019023588 | * | 7/2017 |
| JP | 2019-23587 | A | 2/2019 |
| JP | 2019-23588 | A | 2/2019 |
| JP | 2019-56591 | A | 4/2019 |
| JP | 2019-87044 | A | 6/2019 |
| JP | 2019-184305 | A | 10/2019 |

OTHER PUBLICATIONS

International Search Report and Written Opinion mailed on Mar. 16, 2021, received for PCT Application No. PCT/JP2020/046691, filed on Dec. 15, 2020, 10 pages including English Translation.

Office Action dated Oct. 23, 2024, issued for the corresponding CN patent application No. 202080086075. X and a Partial English translation.

* cited by examiner

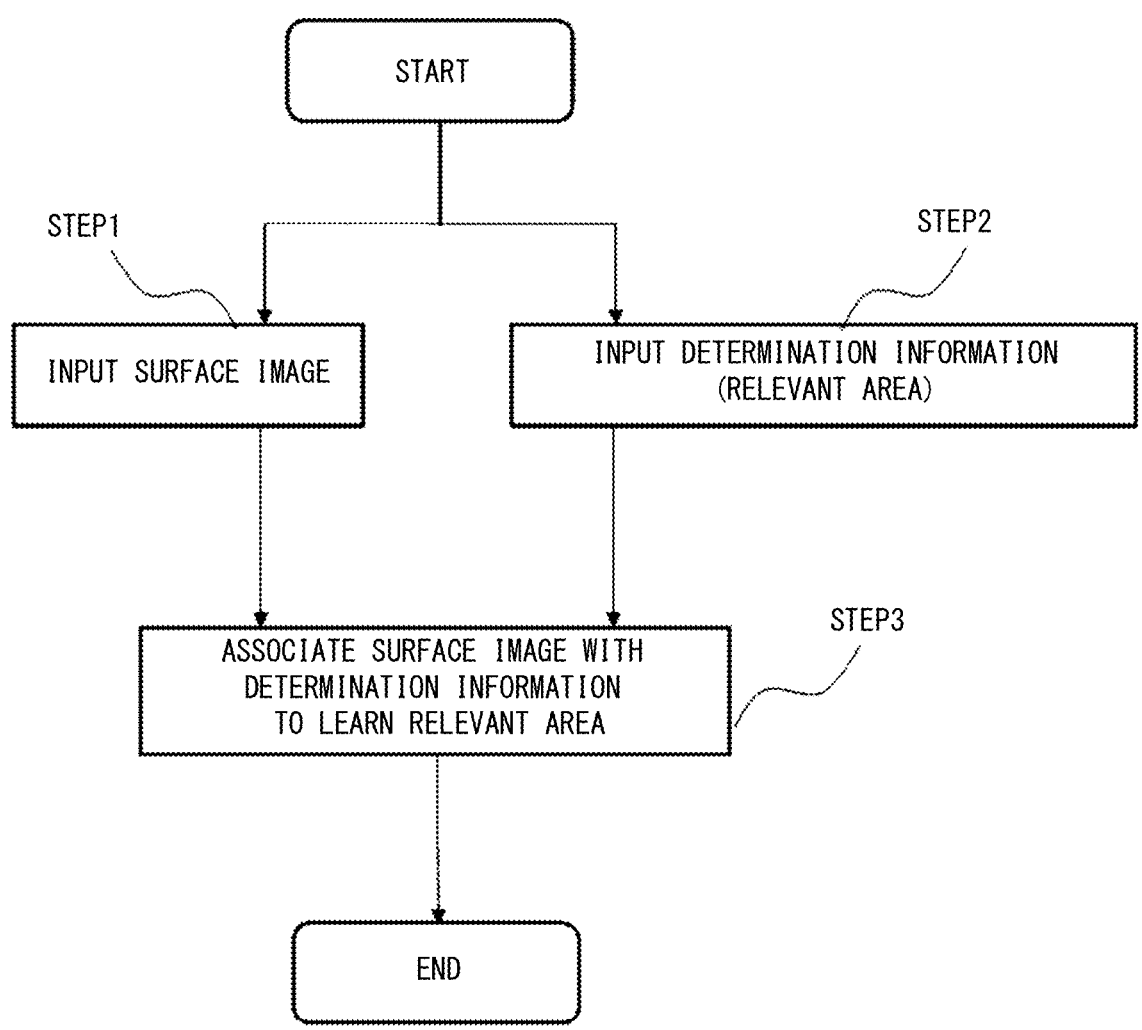

IMAGE-BASED ACCEPTANCE LEARNING DEVICE, IMAGE-BASED ACCEPTANCE DETERMINATION DEVICE, AND IMAGE READING DEVICE

CROSS-REFERENCE TO RELATED APPLICATIONS

The present application is based on PCT filing PCT/JP2020/046691, filed Dec. 15, 2020, which claims priority to JP 2019-226284, filed Dec. 16, 2019, the entire contents of each are incorporated herein by reference.

TECHNICAL FIELD

The present disclosure relates to an image-based acceptance learning device that learns results of determination as to whether a planar object being an examination target is acceptable or defective, an image-based acceptance determination device using the image-based acceptance learning device, and an image reading device using the image-based acceptance learning device.

BACKGROUND ART

A known image reading device examines planar objects (sheet objects) such as films being examination targets for defects such as scratches (see, for example, Patent Literatures 1 and 2). Examples of planar objects include, in addition to films, printed matter, foil, cloth, panels (boards), labels (print labels), semiconductor wafers, and substrates (masks). The image reading devices described in Patent Literatures 1 and 2 examine a film that transmits visible light using both light reflected from the film and light transmitted through the film. The image reading device that examines a planar object may use at least one of the reflected light or transmitted light as appropriate. A planar object may also be examined using, instead of visible light, invisible light such as infrared or ultraviolet rays. Both visible light and invisible light may be used to examine a planar object. Examples of an image reading device for examining a planar object include a device that uses a learning model obtained by machine learning using, for example, artificial intelligence (AI) (see, for example, Patent Literatures 3 and 4).

Patent Literature 3 describes discrimination of defect types of examination targets based on accumulated data of machine learning results about discrimination of defect types included in line segmentation images that vary in luminance and appearance for captured images of the same examination target. Patent Literature 4 describes determination as to whether an examination target object is acceptable or defective with AI based on the matching rate acquired from comparison between basis data created by AI and images of the examination target object.

Another image reading device for examining an examination target determines examination success or failure based on information indicating a label manually assigned to an examination target, instead of determining the acceptance of a physical label (see, for example, Patent Literature 5). Patent Literature 5 describes a learner that learns, through machine learning using data of captured images, the relationship between the image data and the examination success or failure of an object as the examination target.

Examples of an image reading device for examining an examination target include a device including a line sensor such as an erect unmagnified optical system (see, for example, Patent Literatures 1, 2, and 3) and a device including an area sensor such as an optical reduction system or a camera (see, for example, Patent Literatures 4 and 5). Other examples of an image reading device for examining an examination target include a device including a built-in or external light source that illuminates an examination target.

CITATION LIST

Patent Literature

Patent Literature 1: Unexamined Japanese Patent Application Publication No. 2015-68670
Patent Literature 2: Unexamined Japanese Patent Application Publication No. 2019-23587
Patent Literature 3: Unexamined Japanese Patent Application Publication No. 2019-23588
Patent Literature 4: Unexamined Japanese Patent Application Publication No. 2019-56591
Patent Literature 5: Unexamined Japanese Patent Application Publication No. 2019-184305

SUMMARY OF INVENTION

Technical Problem

However, known machine learning may include a learning model trained on determination information without showing a basis for the determination clearly.

In response to the above issue, an objective of the present disclosure is to provide an image-based acceptance learning device that learns results of determination as to whether a planar object is acceptable or defective based on at least one of a three-dimensional shape or a color on the surface of the planar object, an image-based acceptance determination device using the image-based acceptance learning device, and an image reading device using the image-based acceptance learning device.

Solution to Problem

An image-based acceptance learning device according to an aspect of the present disclosure is a device that learns a result of determination as to whether a planar object is acceptable or defective based on at least one of a three-dimensional shape or a color on a surface of the planar object. The device includes a surface image receiver to receive an inputted two-dimensional data being image data of the surface of the planar object, a determination information receiver to receive an inputted determination information indicating the result of determination as to whether the planar object corresponding to the two-dimensional data is acceptable or defective, and a learner to learn, based on the two-dimensional data and the determination information, a relevant area including the three-dimensional shape or the color on the surface in the two-dimensional data. The relevant area is a basis for the determination information.

An image-based acceptance determination device according to an aspect of the present disclosure is a device to use a learning result from an image-based acceptance learning device that learns a result of determination as to whether a planar object is acceptable or defective based on at least one of a three-dimensional shape or a color on a surface of the planar object. The image-based acceptance learning device includes a surface image receiver to receive an inputted two-dimensional data being image data of the surface of the planar object, a determination information receiver to receive an inputted determination information indicating the result of determination as to whether the planar object corresponding to the two-dimensional data is acceptable or defective, and a learner to learn, based on the two-dimensional data and the determination information, a relevant area including the three-dimensional shape or the color on the surface in the two-dimensional data. The relevant area is a basis for the determination information. The image-based acceptance determination device includes a new-surface-image receiver to receive an inputted new two-dimensional data obtained by newly reading the planar object, and an image-based acceptance determiner to determine whether the planar object corresponding to the new two-dimensional data is acceptable or defective based on the leaning result from the learner.

An image reading device according to an aspect of the present disclosure includes an image-based acceptance determination device to use a learning result from an image-based acceptance learning device that learns a result of determination as to whether a planar object is acceptable or defective based on at least one of a three-dimensional shape or a color on a surface of the planar object. The image-based acceptance learning device includes a surface image receiver to receive an inputted two-dimensional data being image data of the surface of the planar object, a determination information receiver to receive an inputted determination information indicating the result of determination as to whether the planar object corresponding to the two-dimensional data is acceptable or defective, and a learner to learn, based on the two-dimensional data and the determination information, a relevant area including the three-dimensional shape or the color on the surface in the two-dimensional data. The relevant area is a basis for the determination information. The image-based acceptance determination device includes a new-surface-image receiver to receive an inputted new two-dimensional data obtained by newly reading the planar object, and an image-based acceptance determiner to determine whether the planar object corresponding to the new two-dimensional data is acceptable or defective based on the leaning result from the learner. The reading device includes an optical device to converge light from the planar object, and a sensor to receive the light converged by the optical device and generate the new two-dimensional data.

Advantageous Effects of Invention

The image-based acceptance learning device according to the above aspect of the present disclosure acquires a learning result (learning model) obtained by learning of a relevant area containing the three-dimensional shape or the color on the surface of a planar object. Thus, the image-based acceptance determination device and the image reading device can perform determination on or read image data of the surface of the planar object with a clear basis portion for determination information.

BRIEF DESCRIPTION OF DRAWINGS

FIG. 2 is a flowchart of an operation of the image-based acceptance learning device (image-based acceptance learning method) according to Embodiment 1.

DESCRIPTION OF EMBODIMENTS

Embodiment 1

Figure 3A:
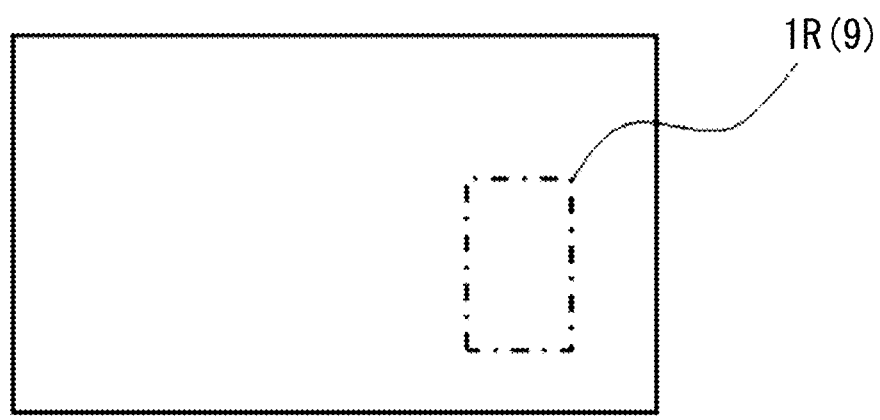
FIGS. 3A, 3B, and 3C each are a diagram of example image data inputted into the image-based acceptance learning device according to Embodiment 1 (new image data inputted into an image reading device according to Embodiment 1)
Figure 3B:
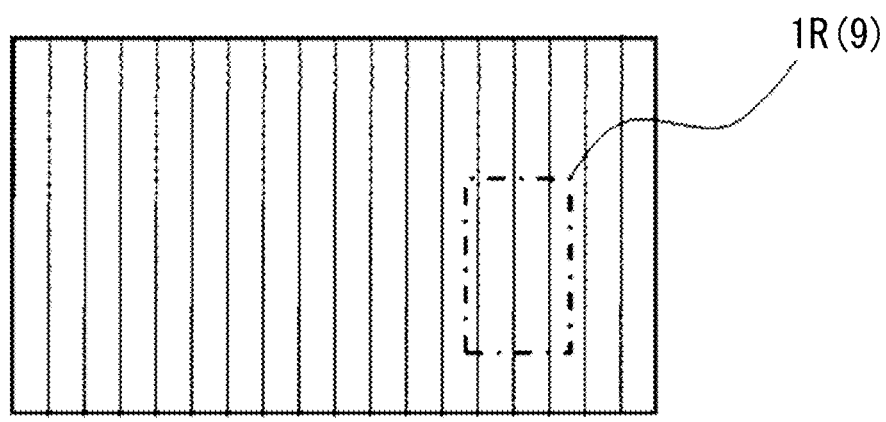
Figure 3C:
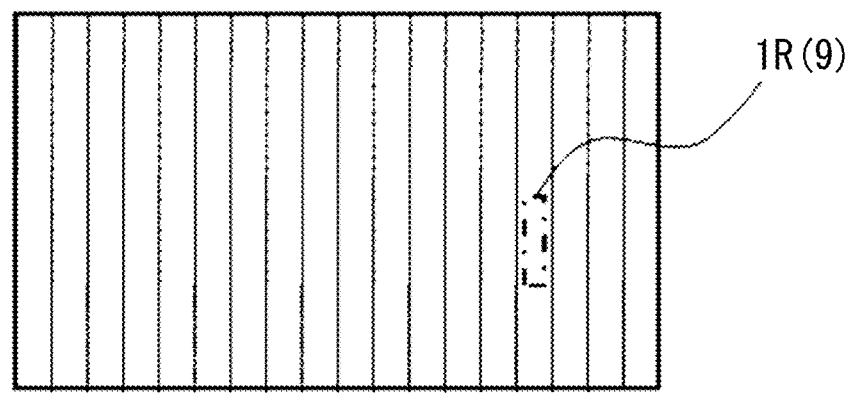

An image-based acceptance learning device according to Embodiment 1, an image-based acceptance determination device using the image-based acceptance learning device, and an image reading device using the image-based acceptance learning device (an image-based acceptance determination device according to Embodiment 1 and an image reading device according to Embodiment 1) will now be described with reference to FIGS. 1A to 6B. In the drawings, the same reference signs denote the same or corresponding elements, and such elements will not be described in detail. In FIGS. 3A to 3C, a planar object 1 being an examination target is, for example, a sheet object such as printed matter, a film, foil, cloth, a panel (board), a label (print label), a semiconductor wafer, or a substrate (mask). Multiple planar objects 1 are herein used in learning. Thus, as the leaning progresses, unknown planar objects 1 in newly captured images (described later) can also be determined as being acceptable or defective.

In FIGS. 1A, 1B, and 3A to 3C, an image-based acceptance learning device 2 learns results of determination as to whether the planar object 1 is acceptable or defective based on at least one of the three-dimensional shape or the color on the surface of the planar object 1 (for example, based on an image including the three-dimensional shape or the color), and builds a learning model (image-based acceptance learning device according to Embodiment 1). The three-dimensional shape of the surface of the planar object 1 is the three-dimensional shape of the planar object 1 in the thickness direction on the surface of the planar object 1. For example, the three-dimensional shape of the surface of the planar object 1 varies in the thickness direction of the planar object 1 or has unevenness formed on the surface of the planar object 1 in the thickness direction of the planar object 1. The color on the surface of the planar object 1 indicates, for example, a change in the color on the surface of the planar object 1. The color may be represented with three attributes including hue, brightness, and chroma.

In FIGS. 1A, 1B, and 3A to 3C, a surface image receiver 3 receives an inputted two-dimensional data that is image data of the surface of the planar object 1. The inputted image data is, for example, data of a captured image of the surface of the planar object 1. In FIGS. 1A and 3A to 3C, a determination information receiver 4 receives an inputted determination information indicating the results of determination as to whether the planar object 1 corresponding to the two-dimensional data is acceptable or defective. A learner 5 learns, based on the two-dimensional data and the determination information, a relevant area 1R containing the three-dimensional shape or the color on the surface in the two-dimensional data being a basis for determination information.

In some embodiments, the surface image receiver 3 receives an inputted two-dimensional data (image data) having, as a three-dimensional shape, at least one of a woven pattern formed on the surface, unevenness formed on the surface, or a component mounted on the surface, or having, as the color, at least one of a drawing pattern (color pattern) on the surface, transparency, or a printed wiring pattern. The two-dimensional data (image data) is acquired by capturing an image of at least one of a woven pattern formed on the surface, unevenness formed on the surface, or a component mounted on the surface as a three-dimensional shape, or capturing an image of at least one of a drawing pattern (color pattern) on the surface, transparency, or a printed wiring pattern as the color. The woven pattern being the three-dimensional shape indicates a pattern acquired by embroidery or dyeing on the cloth of a textile through changes of threads forming the material such as a cloth or the manner of weaving. The woven pattern or the unevenness formed on the surface being a three-dimensional shape can determine the surface smoothness. The pattern of the material of printed matter that is the woven pattern corresponds to a drawing pattern (color pattern) on the surface as the color.

The unevenness formed on the surface includes recesses and through-holes on the surface of, for example, printed matter, a film, foil, cloth, a panel (board), a label (print label), a semiconductor wafer, or a substrate (mask). The component mounted on the surface particularly corresponds to a projection included in the unevenness formed on the surface. More specifically, the component mounted on the surface indicates an object attached to, for example, printed matter, a film, foil, or cloth, or a component mounted on, for example, a panel (board), a label (a print label), a semiconductor wafer, or a substrate (mask). The drawing pattern on the surface as the color indicates a pattern on the surface of, for example, printed matter, a film, foil, cloth, a panel (board), a label (print label), a semiconductor wafer, or a substrate (mask). Such a drawing pattern can be a color pattern (including a monochrome pattern). This color pattern includes a test chart (including a monochrome chart) for a reading test of an image reading device such as a one-dimensional line sensor or a camera (for example, an image reading device 10 described later). Transparency indicates the transparency (visibility or invisibility) of, for example, printed matter, a film, foil, cloth, a panel (board), or a label (print label). The printed wiring pattern indicates a printed wiring pattern on the surface of, for example, printed matter, a film, a panel (board), a semiconductor wafer, or a substrate (mask).

The learner 5 (image-based acceptance learning device 2) may use machine learning such as AI. The learner 5 (image-based acceptance learning device 2) builds and accumulates learning models. As the learner 5 learns more, the learner 5 can more accurately identify, based on the two-dimensional data and the determination information, the relevant area 1R containing the three-dimensional shape or the color on the surface in the two-dimensional data being a basis for determination information. More specifically, at the beginning of learning, the portion of the surface containing the three-dimensional shape or the color used to determine the acceptance in the two-dimensional data has a relatively wide area including a portion substantially irrelevant to the acceptance determination. As the learning progresses, the portion of the surface containing the three-dimensional shape or the color used to determine the acceptance in two-dimensional data includes no or almost no portion substantially irrelevant to the acceptance determination. For example, for the three-dimensional shape of the surface being a component mounted on the surface, the portion including no portion substantially irrelevant to the acceptance determination corresponds to the component (the area of the component), and the portion including almost no portion substantially irrelevant to the acceptance determination corresponds to the component and the surroundings (surrounding area) of the component.

Figure 4:
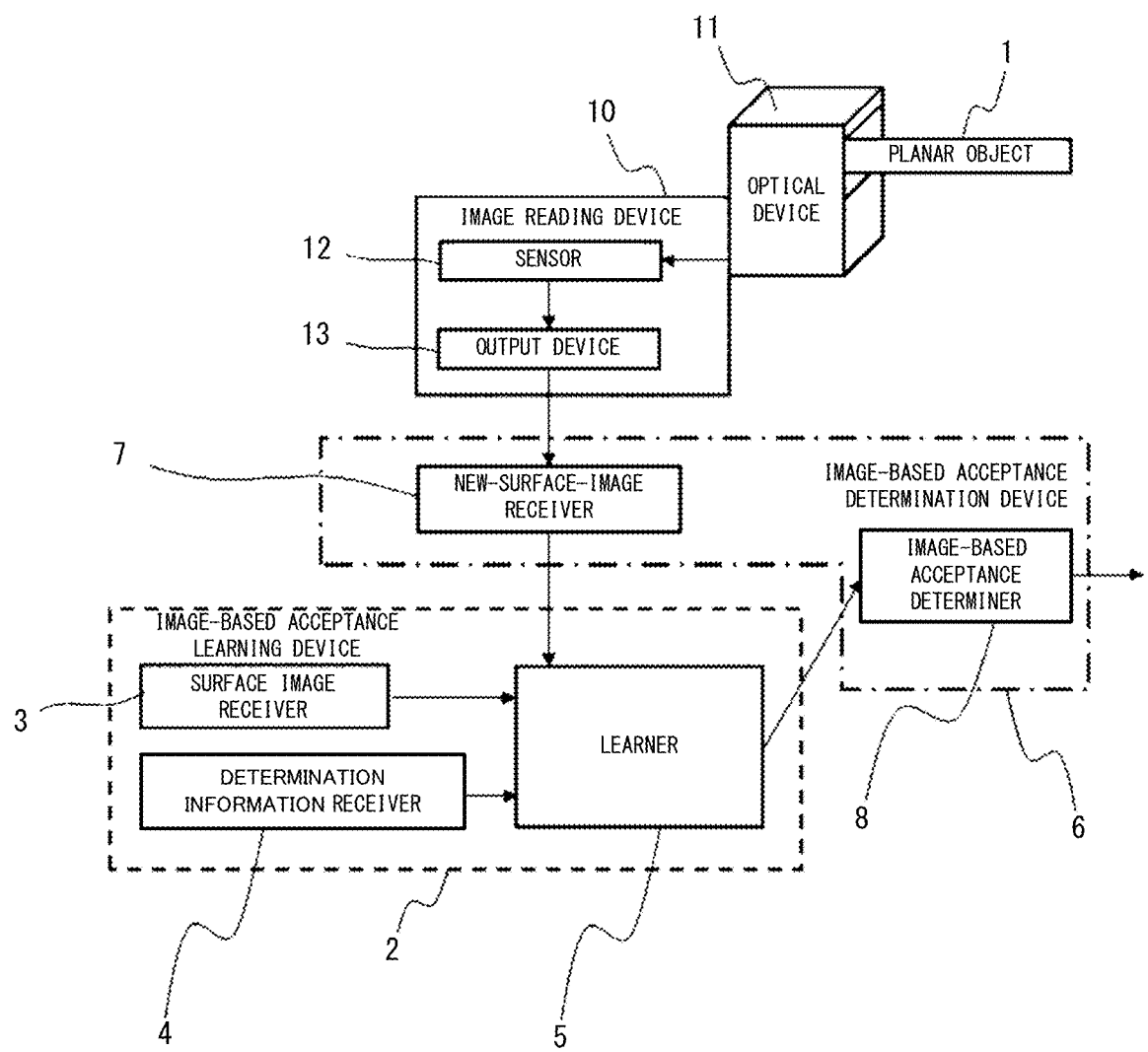
FIG. 4 is a functional block diagram of an image-based acceptance determination device and the image reading device according to Embodiment 1.

Other than specifying (narrowing) the relevant area 1R with the progress of learning, the image-based acceptance learning device 2 may learn the relevant area 1R from the beginning. As shown in FIG. 1B, the surface image receiver 3 may receive an inputted two-dimensional data including information indicating the relevant area 1R. Although not shown, the information indicating the relevant area 1R may be inputted into the image-based acceptance learning device 2 with another means. For example, the determination information receiver 4 may receive an inputted determination information including information indicating the relevant area 1R. The image-based acceptance learning device 2 may include a dedicated relevant area information receiver through which the information indicating the relevant area 1R is inputted into the learner 5. More specifically, in the image-based acceptance learning device 2 shown in FIG. 1A, the learner 5 associates the inputted two-dimensional data with the determination information. In the image-based acceptance learning device 2 shown in FIG. 1B, the learner 5 associates the inputted two-dimensional data with the determination information and with the information indicating the relevant area 1R. The image-based acceptance learning device 2 shown in FIG. 1A corresponds to the image-based acceptance learning device 2 shown in FIG. 4. The image-based acceptance learning device 2 shown in FIG. 1B in the structure as in FIG. 4 is not shown. The information indicating the relevant area 1R may be any information that indicates the position on the planar object 1 such as the coordinates or the distance from the edge of the planar object 1.

The operation of the image-based acceptance learning device according to Embodiment 1 (image-based acceptance learning method according to Embodiment 1) will now be described with reference to FIG. 2. In FIG. 2, step 1 is a process of inputting two-dimensional data that is image data of the surface of the planar object 1 into the surface image receiver 3. Step 2 is a process of inputting, into the determination information receiver 4, determination information indicating the result of determination as to whether the planar object 1 corresponding to the two-dimensional data is acceptable or defective. Steps 1 and 2 may be performed in any order or performed concurrently. Step 3 is a process of training the learner 5 to learn, based on the two-dimensional data and the determination information, the relevant area 1R containing the three-dimensional shape or the color on the surface in the two-dimensional data being a basis for the determination information. Step 3 may be performed using the information indicating the relevant area 1R described above.

The surface image receiver 3 may receive an inputted two-dimensional data that is image data including an array of multiple pieces of linear one-dimensional data (each being a strip of image data that is a part or a column of image data of the planar object 1). For example, a one-dimensional line sensor (corresponding to an example of the image reading device 10 described later) that reads a read target (planar object 1) in a main scanning direction parallel to the direction in which the linear one-dimensional data extends acquires one-dimensional data pieces sequentially in a sub-scanning direction crossing the main scanning direction. The surface image receiver may receive an inputted such two-dimensional data acquired by the one-dimensional linear sensor. In this case, the learner 5 can learn the portion including the relevant area 1R for each piece of one-dimensional data. The learner 5 can also newly generate determination information for a unit of a piece of linear one-dimensional data including the relevant area 1R. In another example, the learner 5 may newly generate determination information for a unit group of multiple strips of image data including the relevant area 1R each corresponding to a part of final image data (two-dimensional data). The multiple strips of image data may be continuous or intermittent images.

Instead of virtual data having a read dimension in the main scanning direction alone, one-dimensional data and new one-dimensional data acquired by the image reading device 10 (described below) herein include, for convenience, strips of image data having a read dimension in the sub-scanning direction of one pixel (sensor element) in addition to the read dimension in the main scanning direction. Thus, the read dimension in the sub-scanning direction varies depending on the dimension of one pixel (sensor element). In other words, although the one-dimensional line sensor reads the dimension in the sub-scanning direction of one pixel (sensor element) in addition to the dimension in the main scanning direction, the sensor is referred to as a one-dimensional line sensor for convenience. The strips of image data may be inputted into the surface image receiver 3 as two-dimensional data to train the learner 5 to learn the individual qualities using the strips of image data. Thus, the strips of image data can herein be either one-dimensional data (new one-dimensional data) or two-dimensional data (new two-dimensional data). In other words, the one-dimensional data (new one-dimensional data) that is a strip of image data can herein also be two-dimensional data (new two-dimensional data). As described above, a strip of image data can be a part (a column) of image data of the planar object 1. The multiple strips of image data described above can also be two-dimensional data.

In each of FIGS. 3A to 3C, the relevant area 1R is surrounded by a dot-and-dash line. Although each of FIGS. 3A to 3C shows one relevant area 1R, the planar object 1 may include multiple relevant areas 1R. FIG. 3A shows the position of the relevant area 1R on the planar object 1. FIG. 3B shows the position of the relevant area 1R in image data including an array of multiple pieces of linear one-dimensional data. FIG. 3C shows a relevant area 1R located in one one-dimensional data piece in the state of FIG. 3B. In FIG. 3B, the relevant area 1R extends across four one-dimensional data pieces. For the relevant area 1R in FIGS. 3B and 3C, as described above, the learner 5 can easily learn the portion including the relevant area 1R for each piece of one-dimensional data, and can further easily generate new determination information by a unit of a piece of the one-dimensional data including the relevant area 1R. The relevant area 1R in new two-dimensional data (new surface image) described later has the same relationship with a new planar object 1 for which new two-dimensional data (new surface image) is acquired. For ease of understanding of the planar object 1 and a sub-scanning zone of the one-dimensional line sensor, FIGS. 3B and 3C show fewer pieces of one-dimensional data than actual. The sub-scanning zone may have more pieces of one-dimensional data, although the number of pieces may change depending on the relative dimensional difference between the planar object 1 and the one-dimensional line sensor.

Examples of acceptable and defective objects in determination information are described below. For image data of printed matter, acceptable objects have an intended color in printed matter, intended arrangement, orientation, and dimensions in resultant printing, or intended arrangement, orientation, and dimensions in a reference mark, whereas defective objects have misalignment, dropouts, streaking, color irregularity, or scratches in printed matter. For image data of a film, acceptable objects have an intended film color, film surface smoothness, and film transparency, whereas defective objects have scratches, cracks, color irregularity, or holes in the film. For image data of foil, acceptable objects have an intended foil color and foil surface smoothness, whereas defective objects have scratches, cracks, color irregularity, or holes in the foil. For image data of cloth, acceptable objects have an intended cloth color, intended orientation and size of a mesh, and intended cloth surface smoothness, whereas defective objects have color irregularity, dropouts, or fluffing of cloth. For image data of a panel (board), acceptable objects have an intended panel color, intended panel surface smoothness, or intended size, orientation, and dimensions of an object (component) on the panel surface, whereas defective objects have color irregularity, scratches, cracks, or holes in the panel.

For image data of a label (print label), acceptable objects have an intended label color, intended label surface smoothness, or indented width, orientation, and dimensions for the print on the label (including a one-dimensional code, a two-dimensional code, a line, or a character), whereas defective objects have misalignment, dropouts, streaking, color irregularity, or scratches in the print on the label. For image data of a semiconductor wafer, acceptable objects have an intended color in the semiconductor wafer, intended surface smoothness for the semiconductor wafer, or intended size, orientation, and dimensions for an object (component) on the surface of the semiconductor wafer, whereas defective objects have color irregularity, scratches, cracks, or holes in the semiconductor wafer. For image data of a substrate (mask), acceptable objects have an intended substrate color, intended substrate surface smoothness, intended position and dimension of a hole in the substrate, intended arrangement, orientation, and dimensions of the print on the substrate (including a one-dimensional code, a two-dimensional code, a line, or a character), an intended state of solder on the substrate, an intended solder fillet on the substrate, or intended presence, arrangement, orientation, or dimensions of a component mounted on the substrate surface, whereas defective objects have color irregularity, scratches, cracks, or holes in the substrate, or misalignment, dropouts, streaking, or scratches in print on the substrate.

As described above, the determination information receiver 4 may receive the inputted determination information including information indicating the relevant area, and the image-based acceptance learning device 2 may include a dedicated relevant area information receiver through which information indicating the relevant area is inputted into the learner 5. In these cases, the information indicating the position in image data being the basis for the acceptance determination in the image data of the planar object 1 as the examination target (data of images of the planar object 1 as the examination target) is used as the information indicating the relevant area. The image data of the planar object 1 as the examination target includes, for example, the image data of printed matter, the image data of a film, the image data of foil, the image data of cloth, the image data of a panel (board), the image data of a label (print label), the image data of a semiconductor wafer, or the image data of a substrate (mask) described above.

The learner 5 can thus build a learning model early by receiving and learning information indicating the relevant area. The learner 5 learns, based on the two-dimensional data (image data) and the determination information, the relevant area containing the three-dimensional shape or the color on the surface of the planar object 1 in the two-dimensional data (image data) being a basis for the determination information. Thus, once receiving a certain number of sets of inputted two-dimensional data (image data) and determination information, the learner 5 can determine the relevant area by comparing two-dimensional data pieces (image data pieces). For example, when multiple image data pieces of the same examination target with the same composition have different acceptance determination results, the difference between the image data pieces indicates the area being the basis for the acceptance determination, or more specifically, indicates the relevant area. In other words, when the two-dimensional data pieces (image data pieces) of the same planar object 1 have different determination results (acceptable and defective) as to whether the planar object 1 is acceptable or defective based on the two-dimensional data (image data) and the determination information, the learner 5 learns, from the difference between the two-dimensional data pieces (image data pieces), the relevant area containing the three-dimensional shape or the color on the surface in the two-dimensional data being a basis for the determination information.

Figure 1A:
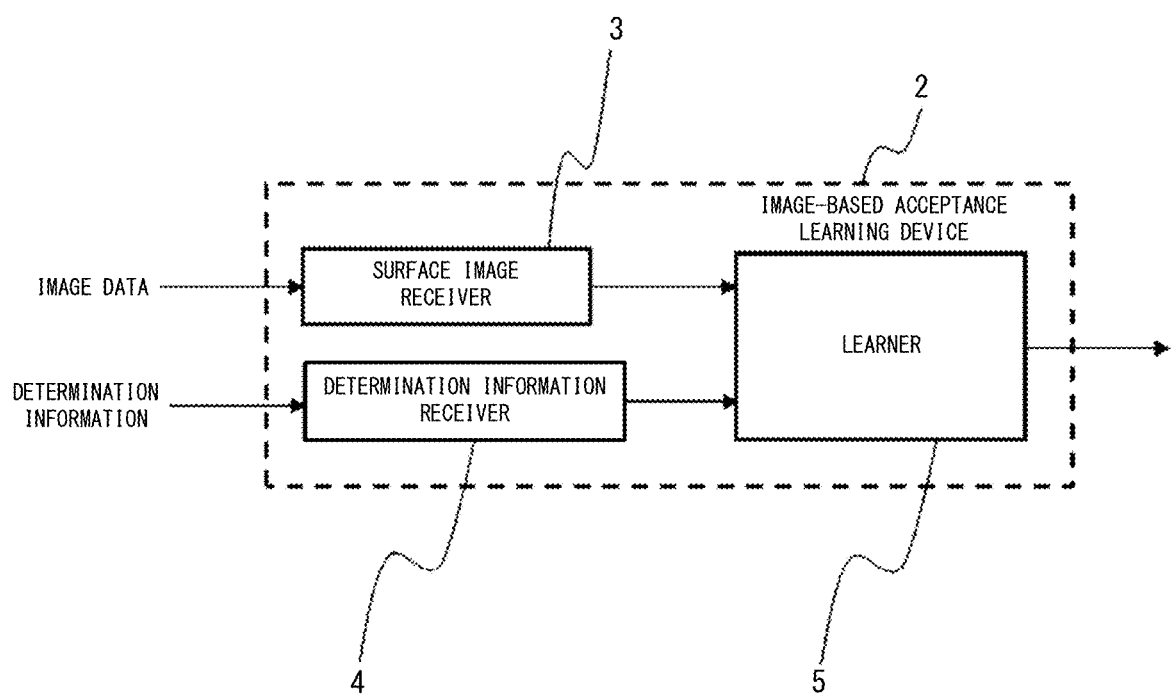
FIGS. 1A and 1B are functional block diagrams of an image-based acceptance learning device according to Embodiment 1.
Figure 1B:
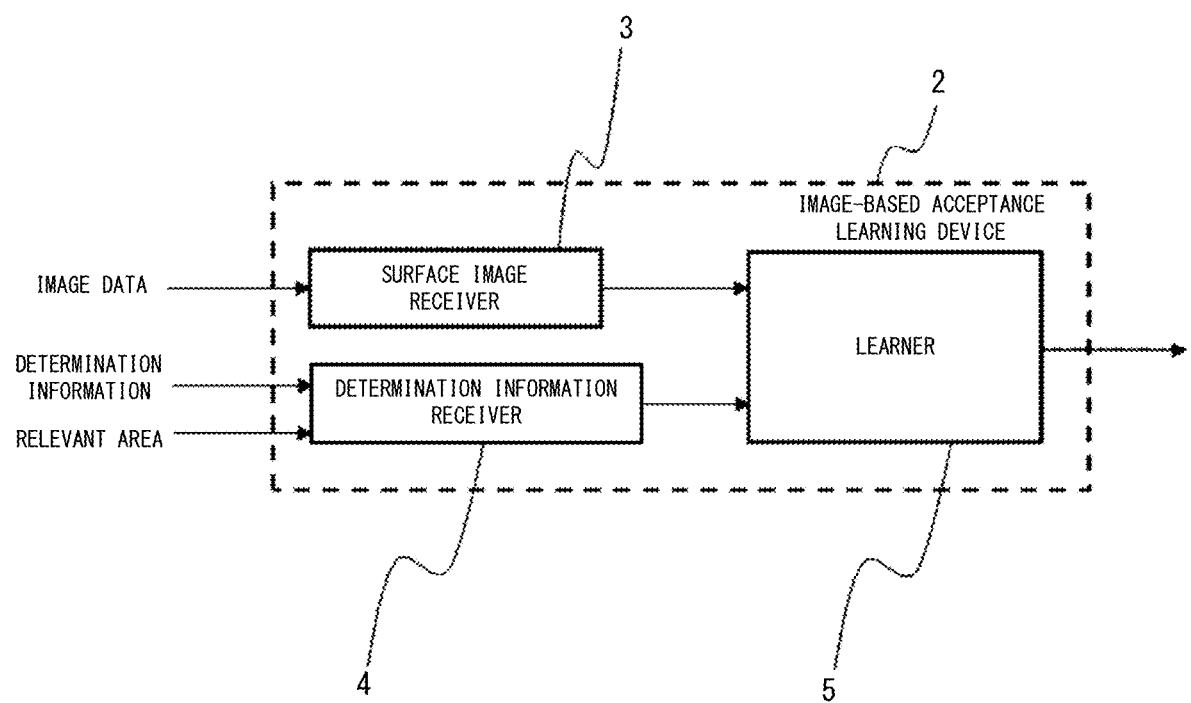

In FIG. 4, an image-based acceptance determination device 6 uses learning results (learning model) from the image-based acceptance learning device 2 shown in FIGS. 1A, 1B, and 4 (the image-based acceptance determination device according to Embodiment 1). A new-surface-image receiver 7 receives an inputted new two-dimensional data (new surface image) acquired by newly reading the planar object 1. The new two-dimensional data (new surface image) is referred to as being new simply to be distinguished from the two-dimensional data (surface image) used by the learner 5 (image-based acceptance learning device 2) to build the learning model. The new two-dimensional data thus includes the existing two-dimensional data (surface image). Thus, the new two-dimensional data (new surface image) may also be referred to as image data to undergo determination.

In FIG. 4, an image-based acceptance determiner 8 determines whether the planar object 1 corresponding to the new two-dimensional data is acceptable or defective based on the learning results from the learner 5. The image-based acceptance determiner 8 may determine whether the planar object 1 corresponding to the new two-dimensional data is acceptable or defective and extract a basis area 9 being a basis for the determination and corresponding to the relevant area 1R in the new two-dimensional data. When the basis area 9 (relevant area 1R) in the new two-dimensional data is thus determined, and the image-based acceptance determiner 8 determines the planar object as being defective, the detective portion can be determined. When the basis area 9 (relevant area 1R) in the new two-dimensional data is determined, and the image-based acceptance determiner 8 determines the planar object as being acceptable, the basis area 9 (relevant area 1R) can be determined as being acceptable.

Similarly, in FIG. 4, the image reading device 10 includes the image-based acceptance determination device 6 (the image reading device according to Embodiment 1). The image reading device 10 includes an optical device 11 and a sensor 12. In some embodiments, the image reading device 10 may also include an output device 13. The optical device 11 converges light (reflection light or transmission light) from the planar object 1. The sensor 12 is a color sensor, and receives light converged by the optical device 11 and generates new two-dimensional data. The output device 13 outputs (transmits) the new two-dimensional data to the new-surface-image receiver 7 as the new two-dimensional data (new surface image) newly acquired through reading of the planar object 1. The output device 13 may be eliminated, and the new two-dimensional data may be directly transmitted from the sensor 12 to the new-surface-image receiver 7. In this case, the sensor 12 has the function of the output device 13.

Figure 5:
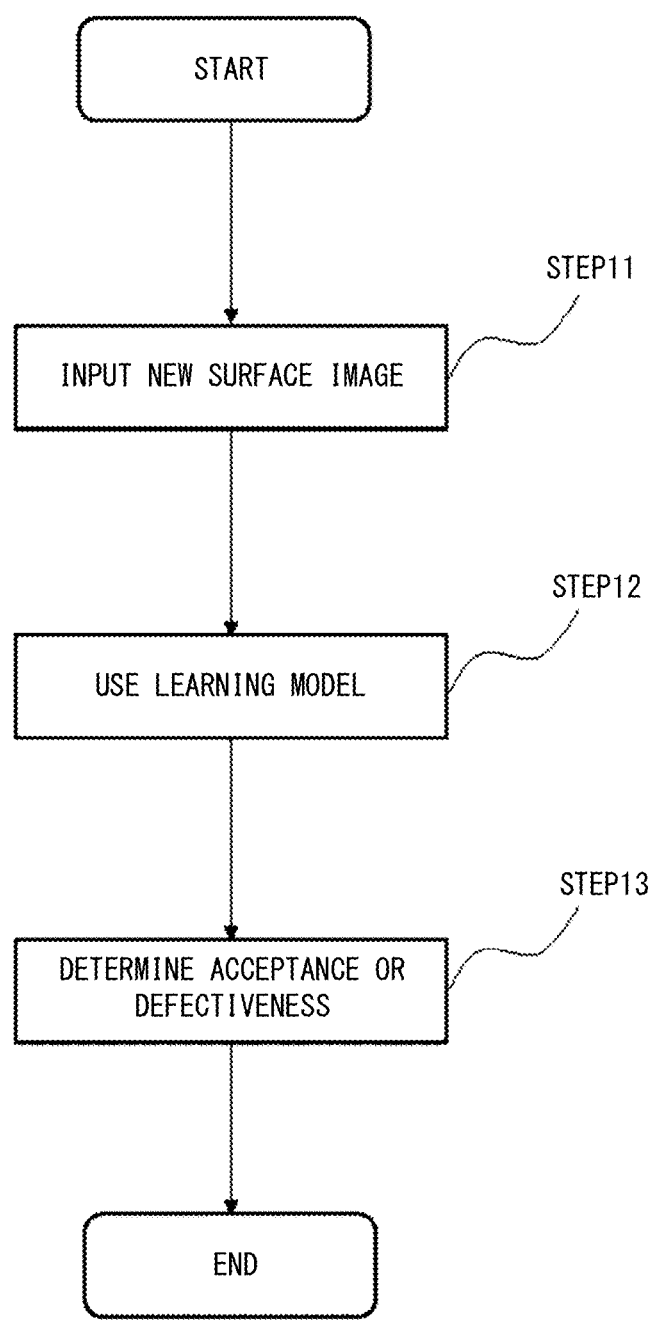
FIG. 5 is a flowchart of operations of the image-based acceptance learning device, the image-based acceptance determination device, and the image reading device according to Embodiment 1 (image-based acceptance determination method)

With reference to FIG. 5, the operation (an image-based acceptance determination method in Embodiment 1) of the image-based acceptance determination device (image reading device) according to Embodiment 1 will now be mainly described. In FIG. 5, step 11 is a process of inputting, into the new-surface-image receiver 7, new two-dimensional data (new surface image) newly acquired through reading of the planar object 1. Step 12 is a process of inputting the newly captured image from the new-surface-image receiver 7 into the learner 5 and using a learning model. Step 13 is a process of the image-based acceptance determiner 8 determining as to whether the planar object 1 corresponding to the new two-dimensional data is acceptable or defective based on the learning results (learning model) from the learner 5. In step 13, the image-based acceptance determiner 8 may extract the basis area 9 being the basis for the determination and corresponding to the relevant area 1R in the new two-dimensional data.

Figure 6A:
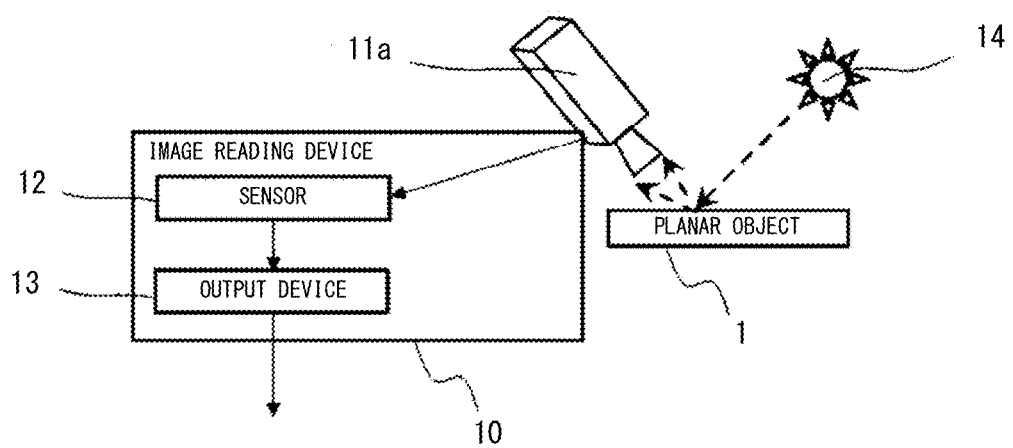
FIGS. 6A and 6B are functional block diagrams of the image reading device according to Embodiment 1.
Figure 6B:
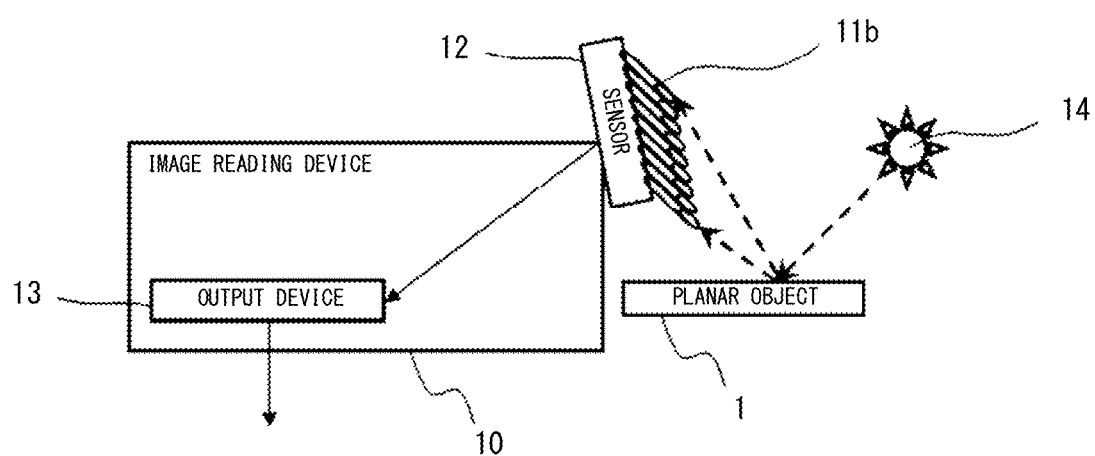

With reference to FIGS. 6A and 6B, an example of the optical device 11 in the image reading device 10 will be described. In FIGS. 6A and 6B, a light source 14 is an illuminator such as a light-emitting diode (LED), an organic electroluminescent (EL) device, or a discharge lamp, and may be a line light source 14 extending in the main scanning direction. The light source 14 illuminates the planar object 1, and the optical device 11 converges the reflection light or transmitted light. The light source 14 may be installed in the image reading device 10, located outside the image reading device 10, or controlled by the image reading device 10. The image reading device 10 and the light source 14 may be controlled by respective higher-order controllers (not shown).

In FIG. 6A, a camera 11a converges light (reflection light or transmission light) from the planar object 1. The camera 11a and the sensor 12 are included in an area sensor. In FIG. 6B, a lens array 11b includes multiple erect unmagnified optical system lenses. The sensor 12 is a sensor element array 12 including multiple sensor elements corresponding to the erect unmagnified optical system lenses. The sensor element array 12 may output new one-dimensional data (being a strip of image data that is a part or a column of image data of the planar object 1) to the new-surface-image receiver 7 upon generation of a piece of the ID data. This structure causes the image-based acceptance determination device 6 to perform the operation described below. In the basic structure of the image-based acceptance determination device 6, the new-surface-image receiver 7 first receives an inputted new two-dimensional data acquired by the image reading device 10 shown in FIG. 6B being a one-dimensional line sensor newly reading the planar object 1. The new two-dimensional data includes new one-dimensional data pieces acquired sequentially in the sub-scanning direction by the image reading device 10. The image-based acceptance determiner 8 then determines whether the planar object 1 corresponding to the new two-dimensional data is acceptable or defective for each piece of new one-dimensional data.

The image-based acceptance determiner 8 can determine whether the planar object 1 corresponding to the new two-dimensional data is acceptable or defective, and further extract the basis area 9 being the basis for this determination and corresponding to the relevant area 1R in the new two-dimensional data for each new one-dimensional data piece. The output device 13 (sensor 12) may be controlled to input, into the new-surface-image receiver 7, a new one-dimensional data piece upon every acquirement of the new one-dimensional data piece by the one-dimensional line sensor. In this case, the image-based acceptance determiner 8 can suspend the determination process upon determining any new one-dimensional data piece being defective. This facilitates determination of a defective object. To examine other portions of the planar object 1 (other than the basis area 9 determined currently) for any relevant area 1R (basis area 9) potentially determined defective, the image-based acceptance determination device 6 may be used again to perform acceptance determination on a subsequent portion in the sub-scanning direction from the currently determined basis area 9.

In such cases, a strip of image data (one-dimensional data) corresponding to an individual portion of the planar object 1 is inputted as two-dimensional data into the surface image receiver 3 to train the learner 5 to learn the acceptance or defectiveness of an individual strip of image data (one-dimensional data). Thus, the image-based acceptance determination device 6 can perform acceptance determination on the planar object 1 without the learner 5 learning the entire image data of the planar object 1. This also includes multiple strips of image data. For example, the individual portions correspond to portions of the planar object 1 including, as a three-dimensional shape, at least one of a woven pattern formed on the surface, unevenness formed on the surface, or a component mounted on the surface, or including, as the color, at least one of a drawing pattern (color pattern) on the surface, transparency, or a printed wiring pattern.

Mainly the image-based acceptance determination device (image reading device) according to Embodiment 1 described above mainly determines the relevant area 1R (basis area 9) being a basis for the determination of the planar object 1 as being defective. However, mainly the image-based acceptance determination device (image reading device) according to Embodiment 1 can also determine the relevant area 1R (basis area 9) being the basis for determination as being acceptable. In mainly the image-based acceptance determination device (image reading device) according to Embodiment 1, the acceptance determination includes, in addition to the determination as to whether an object is acceptable or defective, determination as to whether an area is acceptable or defective. In other words, when at least one of areas in the planar object 1 is determined as being defective, the entire planar object 1 may be determined as being defective, or each area in the planar object 1 may be separately determined as being acceptable or defective.

The same applies to learning of the learner 5 in mainly the image-based acceptance learning device according to Embodiment 1. In other words, the image-based acceptance learning device 2 may train the learner 5 in advance in accordance with the type of acceptance determination to be performed by the image-based acceptance determination device 6. For a larger scaled learner 5 (learning model), the learner 5 may learn all the variations of the acceptance determination. More specifically, although FIGS. 3A to 3C each show one relevant area 1R (basis area 9), image data may include multiple relevant areas 1R (basis areas 9).

In such a case, the surface image receiver 3 receives an inputted linear one-dimensional data (a strip of image data that is a part or a column of image data of the planar object 1) as two-dimensional data. This also includes multiple strips of image data. In other words, the surface image receiver 3 receives an inputted linear one-dimensional data as two-dimensional data. For example, a one-dimensional line sensor (image reading device 10) that reads a read target (planar object 1) in a main scanning direction parallel to the direction in which the linear one-dimensional data extends acquires a strip of image data (a part or a column of image data of the planar object 1) with at least one scanning operation performed in a sub-scanning direction crossing the main scanning direction. The surface image receiver 3 may receive an inputted such a strip of image data. The part or the column of image data of the planar object 1 indicates at least one column of image data shown in FIGS. 3B and 3C.

As described above, the image-based acceptance learning device according to Embodiment 1, the image-based acceptance determination device using the image-based acceptance learning device, and the image reading device using the image-based acceptance learning device learn, based on the two-dimensional data (strips of image data that include one-dimensional data) of the planar object 1 and the determination information as to whether the planar object 1 is acceptable or defective, the relevant area containing the three-dimensional shape or the color on the surface of the planar object 1 in two-dimensional data (strips of image data that include one-dimensional data) being a basis for the determination information as to whether the planar object 1 is acceptable or defective. The image-based acceptance learning device, the image-based acceptance determination device, and the image reading device can thus provide learning results (learning model) obtained by learning of the relevant area being the basis for the determination information.

REFERENCE SIGNS LIST

1 Planar object
1R Relevant area
2 Image-based acceptance learning device
3 Surface image receiver
4 Determination information receiver
5 Learner
6 Image-based acceptance determination device
7 New-surface-image receiver
8 Image-based acceptance determiner
9 Basis area
10 Image reading device
11 Optical device
11a Camera
11b Lens array
12 Sensor (sensor element array)
13 Output device
14 Light source (line light source)

The invention claimed is:

1. An image-based acceptance learning device that learns based upon a result of a determination as to whether a planar object is acceptable or defective based on image data of a surface of the planar object having at least one of a three-dimensional shape or a color on the surface, the image-based acceptance learning device comprising:
- a surface image receiver to receive an inputted two-dimensional data including the image data of the surface of the planar object;
- a determination information receiver to receive an inputted determination information indicating the result of the determination as to whether the planar object corresponding to the two-dimensional data is acceptable or defective; and
- learning circuitry to learn, based on the inputted two-dimensional data and the inputted determination information, a relevant area including the at least one of the three-dimensional shape or the color on the surface in the two-dimensional data, the relevant area being a two-dimensional area of the surface of the planar object that is a basis for the determination as to whether the planar object corresponding to the two-dimensional data is acceptable or defective, wherein
the inputted two-dimensional data includes an array of pieces of linear one-dimensional data, and
the learning circuitry learns a portion including the relevant area for each piece of the linear one-dimensional data.

2. The image-based acceptance learning device according to claim 1, wherein the two-dimensional data includes, as the three-dimensional shape, at least one of a woven pattern formed on the surface, unevenness formed on the surface, or a component mounted on the surface or includes, as the color, at least one of a drawing pattern on the surface, transparency, or a printed wiring pattern.

3. The image-based acceptance learning device according to claim 1, wherein the inputted two-dimensional data includes information indicating the relevant area.

4. The image-based acceptance learning device according to claim 1, wherein the inputted determination information includes information indicating the relevant area.

5. The image-based acceptance learning device according to claim 1, wherein the learning circuitry generates determination information corresponding to the linear one-dimensional data based on the inputted determination information corresponding to the two-dimensional data for a unit of a piece of the linear one-dimensional data including the relevant area.

6. The image-based acceptance learning device according to claim 1, wherein
the pieces of linear one-dimensional data are acquired by a one-dimensional line sensor sequentially in a sub-scanning direction crossing a main scanning direction, and
the one-dimensional line sensor reads a read target in the main scanning direction.

7. The image-based acceptance learning device according to claim 6, wherein
the image-based acceptance learning device forms a part of a system,
the system further includes an image-based acceptance determination device including:
- a new-surface-image receiver to receive an inputted new two-dimensional data obtained by newly reading the planar object; and
- image-based acceptance determining circuitry to determine whether the planar object corresponding to the new two-dimensional data is acceptable or defective based on the learning result from the learning circuitry, the new two-dimensional data includes pieces of new one-dimensional data acquired by the one-dimensional line sensor sequentially in the sub-scanning direction, and
the image-based acceptance determining circuitry determines whether the planar object corresponding to the new two-dimensional data is acceptable or defective for each piece of the new one-dimensional data.

8. The image-based acceptance learning device according to claim 7, wherein the image-based acceptance determining circuitry extracts a basis area in the new two-dimensional data corresponding to the relevant area learned by the learning circuitry for each piece of new one-dimensional data, the basis area being a basis for the determination.

9. The image-based acceptance learning device according to claim 7, wherein
the new-surface-image receiver receives the inputted new one-dimensional data newly acquired upon every acquirement of the new one-dimensional data by the one-dimensional line sensor, and
the image-based acceptance determining circuitry suspends a determination process upon determining a piece of the new one-dimensional data as being defective.

10. The image-based acceptance learning device according to claim 7, wherein the system includes an image reading device including:
- a lens array of a plurality of erect unmagnified optical system lenses in the main scanning direction, the lens array being configured to converge light from the planar object; and
- a sensor element array of a plurality of sensor elements in the main scanning direction, the plurality of sensor elements corresponding to the plurality of erect unmagnified optical system lenses, the sensor element array being configured to receive the light converged by the lens array and generate the new two-dimensional data.

11. The image-based acceptance learning device according to claim 10, wherein
the sensor element array outputs the new one-dimensional data to the new-surface-image receiver upon generation of a piece of the new one-dimensional data.

12. The image-based acceptance learning device according to claim 7, wherein the system includes an image reading device including:
- an optical device to converge light from the planar object; and
- a sensor to receive the light converged by the optical device and generate the new two-dimensional data.

13. The image-based acceptance learning device according to claim 12, wherein
the optical device includes a lens array of a plurality of erect unmagnified optical system lenses, and
the sensor includes a sensor element array of a plurality of sensor elements corresponding to the plurality of erect unmagnified optical system lenses.

14. The image-based acceptance learning device according to claim 13, wherein
the sensor element array outputs the new one-dimensional data to the new-surface-image receiver upon generation of a piece of the new one-dimensional data.

15. The image-based acceptance learning device according to claim 1, wherein the relevant area includes an area of the surface of the planar object that is a basis for a determination that the planar object is acceptable.

16. A system comprising:
an image-based acceptance learning device including:
  a surface image receiver to receive an inputted two-dimensional data including image data of a surface of a planar object having at least one of a three-dimensional shape or a color on the surface;
  a determination information receiver to receive an inputted determination information indicating a result of a determination as to whether the planar object corresponding to the two-dimensional data is acceptable or defective; and
  learning circuitry to learn, based on the inputted two-dimensional data and the inputted determination information a relevant area including the at least one of the three-dimensional shape or the color on the surface in the two-dimensional data, the relevant area being a two-dimensional area of the surface of the planar object that is a basis for the determination as to whether the planar object corresponding to the two-dimensional data is acceptable or defective, and
an image-based acceptance determination device to use a learning result from the image-based acceptance learning device and including:
  a new-surface-image receiver to receive an inputted new two-dimensional data obtained by newly reading the planar object; and
  image-based acceptance determining circuitry to determine whether the planar object corresponding to the new two-dimensional data is acceptable or defective based on the leaning result, wherein
the image-based acceptance determining extracts a basis area in the new two-dimensional data corresponding to the relevant area learned by the learning circuitry, the basis area being a basis for the determination,
the inputted two-dimensional data includes an array of pieces of linear one-dimensional data, and
the learning circuitry learns a portion including the relevant area for each piece of the linear one-dimensional data.

17. The system according to claim 16, further comprising an image reading device including:
an optical device to converge light from the planar object; and
a sensor to receive the light converged by the optical device and generate the new two-dimensional data.

18. The system according to claim 17, wherein
the optical device includes a lens array of a plurality of erect unmagnified optical system lenses, and
the sensor includes a sensor element array of a plurality of sensor elements corresponding to the plurality of erect unmagnified optical system lenses.

19. The system according to claim 18, wherein the sensor element array outputs the new one-dimensional data to the new-surface-image receiver upon generation of a piece of the new one-dimensional data.

20. An image-based acceptance determination device to use a learning result from an image-based acceptance learning device that learns based upon a result of a determination as to whether a planar object is acceptable or defective based on image data of a surface of the planar object having at least one of a three-dimensional shape or a color on the surface, wherein
the image-based acceptance learning device comprises:
  a surface image receiver to receive an inputted two-dimensional data being including the image data of the surface of the planar object,
  a determination information receiver to receive an inputted determination information indicating the result of the determination as to whether the planar object corresponding to the two-dimensional data is acceptable or defective, and
  learning circuitry to learn, based on the inputted two-dimensional data and the inputted determination information, a relevant area including the at least one of the three-dimensional shape or the color on the surface in the two-dimensional data, the relevant area being a two-dimensional area of the surface of the planar object that is a basis for the determination as to whether the planar object corresponding to the two-dimensional data is acceptable or defective,
the inputted two-dimensional data includes an array of pieces of linear one-dimensional data acquired by a one-dimensional line sensor sequentially in a sub-scanning direction crossing a main scanning direction,
the one-dimensional line sensor reads a read target in the main scanning direction,
the image-based acceptance determination device comprises:
  a new-surface-image receiver to receive an inputted new one-dimensional data obtained by newly reading the planar object, and
  image-based acceptance determining circuitry to determine whether the planar object corresponding to the new one-dimensional data is acceptable or defective based on the learning result from the learning circuitry,
the new-surface-image receiver receives the new one-dimensional data acquired by the one-dimensional line sensor sequentially in the sub-scanning direction, and
the image-based acceptance determining circuitry determines whether the planar object corresponding to the new one-dimensional data is acceptable or defective for each piece of new one-dimensional data.

21. The image-based acceptance determination device according to claim 20, wherein the two-dimensional data includes, as the three-dimensional shape, at least one of a woven pattern formed on the surface, unevenness formed on the surface, or a component mounted on the surface or includes, as the color, at least one of a drawing pattern on the surface, transparency, or a printed wiring pattern.

22. The image-based acceptance determination device according to claim 20, wherein the inputted the two-dimensional data includes information indicating the relevant area.

23. The image-based acceptance determination device according to claim 20, wherein the inputted the determination information includes information indicating the relevant area.

24. The image-based acceptance determination device according to claim 20, wherein
the image-based acceptance determination device forms a part of a system, and
the system further includes an image reading device including:
  an optical device to converge light from the planar object; and
  a sensor to receive the light converged by the optical device and generate the new one-dimensional data.

25. The image-based acceptance determination device according to claim 24, wherein
the optical device includes a lens array of a plurality of erect unmagnified optical system lenses, and the sensor includes a sensor element array of a plurality of sensor elements corresponding to the plurality of erect unmagnified optical system lenses.

26. The image-based acceptance determination device according to claim 25, wherein the sensor element array outputs the new one-dimensional data to the new-surface-image receiver upon generation of a piece of the new one-dimensional data.

\* \* \* \* \*